3,071,576
SYNTHETIC PENICILLINS
Frank Peter Doyle, Betchworth, and John Herbert Charles Nayler, Cliftonville, Dorking, England, assignors to Beecham Research Laboratories Limited, Brentford, England, a British company
No Drawing. Filed Nov. 8, 1960, Ser. No. 67,905
Claims priority, application Great Britain Nov. 13, 1959
4 Claims. (Cl. 260—239.1)

This invention relates to substances having antibiotic activity which are of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to a class of derivatives of 6-aminopenicillanic acid which we term α-oxo-substituted penicillins.

Antibacterial agents such as benzylpenicillin have proved highly effective in the past in the therapy of infections due to Gram-positive bacteria but such agents suffer from the serious drawbacks of being unstable in aqueous acids, e.g., upon oral administration, and of being ineffective against numerous so-called resistant strains of bacteria, e.g., penicillin-resistant strains of Straphylococcus aureus (Micrococcus pyogenes var. aureus). In addition, benzylpenicillin is not an effective agent against many bacteria which produce penicillinase. Many of the compounds of the present invention, in addition to their antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith.

There is provided according to the present invention a member selected from the group consisting of an acid having the formula

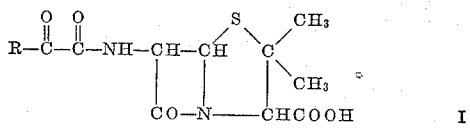

wherein R is an alkyl, cycloalkyl, aralkyl or aryl group, and nontoxic salts thereof.

Thus R may be an alkyl group having 1 to 20 carbon atoms inclusive. The term "alkyl" as used herein refers to straight and branched chain saturated aliphatic hydrocarbon groups having from 1 to 20 carbon atoms inclusive, e.g., methyl, ethyl, propyl, butyl, isobutyl, amyl, hexyl, lauryl, octadecyl, tetradecyl, hexadecyl, etc. The "(lower)alkyl" groups, i.e., those having from 1 to 6 carbon atoms, inclusive, are preferred. R may also be an alicyclic group such as cyclopentyl, cyclohexyl or cycloheptyl. Where R is aryl it may be phenyl or the radical

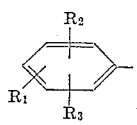

wherein $R_1$, $R_2$ and $R_3$ are each members selected from the group consisting of hydrogen, nitro, amino, (lower)-alkylamino, di(lower)alkylamino, acylamino (where the acylating agent is an aliphatic carboxylic acid containing from one to ten carbon atoms inclusive and the substituent may thus also be named (lower)-alkanoyl-amino), (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl. Where R is aralkyl it is preferably benzyl but may also be

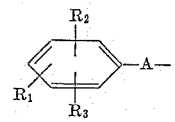

wherein $R_1$, $R_2$ and $R_3$ have the meaning set forth above and A represents a bivalent saturated alkylene chain which may be a straight or a branched chain and which contains from one to ten carbon atoms inclusive. Suitable salts include nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N' - bis - dehydroabietylethylenediamine, N-(lower)alkyl-piperidines, especially N-ethyl-piperidine, and other amines which have been used to form salts with benzylpenicillin. Also included within the scope of the present invention are easily hydrolysed esters which are converted to the free acid form by chemical or enzymatic hydrolysis.

The present invention further provides a process for the preparation of penicillins of the general Formula I wherein 6-aminopenicillanic acid, preferably in the form of a neutral salt such as the sodium salt or the triethylamine salt, or a liquor containing 6-aminopenicillanic acid is reacted with an acid chloride of the general formula:

R.CO.CO.Cl wherein R is as hereinbefore defined, or its functional equivalent as an acylating agent for a primary amine group. Such equivalents include the corresponding carboxylic acid bromides, acid anhydrides and mixed anhydrides with other carboxylic acids, including monoesters, and particularly lower aliphatic esters, of carbonic acid.

One method of preparing penicillins of the present invention by way of a mixed anhydride of an alkyl chlorocarbonate comprises mixing an acid (whose acid chloride is defined above), with the alkylchlorocarbonate and a tertiary hydrocarbonyl or aliphatic amine such as triethylamine in an anhydrous, inert and preferably water-miscible solvent such as dioxane and, if desired, a small amount of pure, dry acetone for about thirty minutes in the cold, e.g., at about 4° C. To this solution of the mixed anhydride there is then added a chilled solution of 6-aminopenicillanic acid and tertiary hydrocarbonyl amine, e.g., triethylamine, in, for example, a solvent such as water to form the substituted ammonium salts of the desired product. The mixture may then, if desired, be extracted at alkaline pH with a water-immiscible solvent such as ether to remove unreacted starting materials. The product in the aqueous phase is then converted to the free acid, preferably in the cold under a layer of ether by the addition of dilute mineral acid. The free acid is then extracted into a water-immiscible, neutral organic solvent such as ether and the extract is washed, if desired, and then dried. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a penicillin of the present invention comprises preparing an aqueous solution of 6-aminopenicillanic acid and sodium bicarbonate and then adding the acid chloride. The mixture is then extracted with ether to remove unreacted or hydrolysed starting materials. The solution is then acidified and the free acid form of the product is extracted into ether. This ethereal extract is dried, e.g., with anhydrous sodium sulphate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by equimolecular amount of the corresponding acid bromide or acid anhydride.

Since some of the antibiotic substances obtained by the process of this invention are relatively unstable compounds which readily undergo chemical changes resulting in the loss of antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substances.

The temperature chosen for the process of preparation of the derivatives of 6-aminopenicillanic acid should, in general, not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents, e.g., dimethylformamide, dimethylacetamide, chloroform, acetone, methyl, isobutyl ketone and dioxane. Frequently it is highly satisfactory to add an aqueous solution of a salt of 6-aminopenicillanic acid to a solution of the acylating agent in an inert solvent which is miscible with water, such as acetone or dimethylformamide. Vigorous stirring is, of course, advisable when more than one phase is present, e.g., solid and liquid or two liquid phase.

At the conclusion of the reaction, the products are isolated, if desired, by the techniques used with benzylpenicillin and phenoxymethylpenicillin. Thus, the product can be extracted into diethyl ether or n-butanol at an acid pH and then recovered by lyophilisation or by conversion to a solvent-insoluble salt, as by neutralisation with an n-butanol solution of potassium 2-ethylhexanoate, or the product can be precipitated from aqueous solution as a water-insoluble salt of an amine or recovered directly by lyophilisation, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilisation, or if the product is insoluble, by filtration. One method of isolating the product as a crystalline potassium salt comprises extracting the product from an acidic, aqueous solution (e.g., pH 2) into diethyl ether, drying the ether and adding at least one equivalent of a concentrated solution of potassium 2-ethylhexanoate in dry n-butanol. The potassium salt forms precipitates, usually in crystalline form, and is collected by filtration or decantation.

The following examples illustrate the invention. In the examples the abbreviations "Me," "Et" and "Ph" mean methyl, ethyl and phenyl, respectively.

EXAMPLE 1

*Ethoxycarbonylpenicillin*

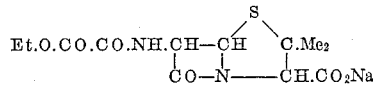

A solution of ethoxyoxalyl chloride (Et.O.CO.CO.Cl, 280 mg.) in dry acetone (5 ml.) was added dropwise during 10 minutes to a stirred solution of 6-aminopenicillanic acid (400 mg.) and sodium bicarbonate (466 mg.) in water (16 ml.) and acetone (11 ml.). When addition was complete the mixture was stirred at room temperature for 30 mins. and then extracted with ether (32 ml. in 3 portions), only the aqueous phase being retained. This aqueous phase was cooled to 5° C., covered with butanol (7 ml.) and adjusted to pH 2 by adding dilute hydrochloric acid. After separating the layers, the aqueous phase was extracted with three further 3 ml. portions of butanol. The combined butanol solutions (which at this stage contained the free penicillin acid) were washed with water (3 x 5 ml.) and then shaken with water (20 ml.) to which sufficient 3% sodium bicarbonate was added to bring the aqueous phase to pH 7. The butanol solution was further extracted with two 5 ml. portions of water to each of which was added enough bicarbonate solution to produce an aqueous phase of pH 7. The combined aqueous solutions were washed with ether (25 ml.) and then evaporated at low temperature and pressure to leave the crude sodium salt of ethoxycarbonylpenicillin which, after drying in a vacuum desiccator, was obtained as a very hygroscopic yellow solid (191 mg.). It was estimated by manometric assay to be 42% pure. It inhibited *Staph. aureus* at a concentration of 50 mcg./ml.

EXAMPLE 2

*Benzoylpenicillin*

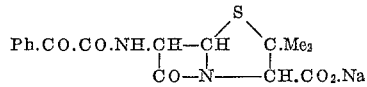

A solution of phenylglyoxylic acid (Ph.CO.CO₂H, 330 mg.) and triethylamine (0.34 ml.) in dry acetone (17 ml.) was stirred and cooled to 0° C. A solution of ethyl chlorocarbonate (0.19 ml.) in a little acetone was added and the mixture was stirred for 5 mins. at 0° C. It then contained the mixed ethoxyformic anhydride of phenylglyoxylic acid in solution, together with suspended triethylamine hydrochloride. An ice-cold solution of 6-aminopenicillanic acid (450 mg.) and sodium bicarbonate (510 mg.) in water (17 ml.) was added rapidly with vigorous stirring to the strongly cooled mixture containing the mixed anhydride. The mixture was stirred for 30 mins. at 0° C. and then for a further 30 mins. whilst it attained room temperature. The resulting benzoylpenicillin was isolated by the procedure described in Example 1, which gave 351 mg. of crude sodium salt as a pale yellow hygroscopic solid which was estimated by manometric assay to be 45% pure. It inhibited *Staph. aureus* at a concentration of 0.12 mcg./ml.

EXAMPLE 3

The following penicillins were prepared by coupling either an acid halide or a mixed anhydride derived from the acid or mono-ester of oxalic acid named with 6-aminopenicillanic acid by the methods hereinbefore set forth.

| Acid: | Penicillin. |
|---|---|
| Pyruvic acid | Acetylpenicillin. |
| Dimethylpyruvic acid | Isobutyrylpenicillin. |
| α-Oxohexanoic acid | n-Valerylpenicillin. |
| Phenylpyruvic acid | Phenylacetylpenicillin. |
| Methylhydrogen oxalate | Methoxycarbonylpenicillin. |
| n-Butyl hydrogen oxalate | n-Butoxycarbonylpenicillin. |
| Cyclohexyl hydrogen oxalate | Cyclohexyloxycarbonylpenicillin. |
| Phenyl hydrogen oxalate | Phenoxycarbonylpenicillin. |
| Benzyl hydrogen oxalate | Benzyloxycarbonylpenicillin. |
| Cyclohexylglyoxylic acid | Hexahydrobenzoylpenicillin. |

We claim:
1. Benzoylpenicillin.
2. Phenylacetylpenicillin.
3. Phenoxycarbonylpenicillin.
4. A member selected from the group consisting of an acid having the formula

$$X-\overset{O}{\underset{\|}{C}}-\overset{O}{\underset{\|}{C}}-NH-CH-\underset{CO-N\text{———}CHCOOH}{\overset{S}{CH}}\underset{}{\overset{CH_3}{\underset{CH_3}{C}}}$$

wherein X is a member selected from the group consisting of R— and R—O— in which R represents a member selected from the group consisting of aralkyl having the formula

[structure with $R^1$, $R^2$, $R^3$ on benzene ring with —A—]

wherein A represents a bivalent saturated alkylene chain containing from one to ten carbon atoms and aryl having the formula

[structure with $R^1$, $R^2$, $R^3$ on benzene ring]

wherein $R^1$, $R^2$ and $R^3$ are each members selected from the group consisting of hydrogen, nitro, amino, (lower)alkylamino, di-(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl; and its sodium, potassium, calcium, aluminum and ammonium salts and its nontoxic substituted ammonium salts with an amine selected from the group consisting of tri-(lower)alkylamines, procaine, dibenzylamine, N-(lower)alkylpiperidines, N-benzyl-beta-phenethylamine, 1-ethenamine, N,N'-dibenzylethylenediamine, dehydroabietylamine and N,N'-bis-dehydrobietylethylenediamine.

References Cited in the file of this patent

UNITED STATES PATENTS 2,941,995   Doyle et al. _____ June 21, 1960

FOREIGN PATENTS 569,728   Belgium _____ Nov. 15, 1958

OTHER REFERENCES

Clarke et al.: The Chemistry of Penicillin, pages 667–668 and 673–679 (1949).